NEGATIVE-IMPEDANCE REPEATER

Filed April 28, 1959 3 Sheets-Sheet 1

INVENTORS R. W. DE MONTE
W. J. KOPP
BY Ralph T. Holcomb
ATTORNEY

TERMINAL IMPEDANCE-$Z_{a1}$ FOR SERIES OR BRIDGING BRANCH

TERMINAL IMPEDANCE-$Z_{b1}$ FOR DIAGONAL OR SHUNT BRANCH

TERMINAL IMPEDANCE-$Z_{a2}$ FOR SERIES OR BRIDGING BRANCH

TERMINAL IMPEDANCE-$Z_{b2}$ FOR DIAGONAL OR SHUNT BRANCH

INVENTORS R. W. DE MONTE
W. J. KOPP

BY Ralph T. Holcomb
ATTORNEY

Dec. 11, 1962 R. W. DE MONTE ET AL 3,068,329

NEGATIVE-IMPEDANCE REPEATER

Filed April 28, 1959 3 Sheets-Sheet 3

INVENTORS R. W. DE MONTE
W. J. KOPP

BY Ralph T. Holcomb

ATTORNEY

United States Patent Office 3,068,329

Patented Dec. 11, 1962

3,068,329

NEGATIVE-IMPEDANCE REPEATER

Robert W. De Monte, Berkeley Heights, N.J., and William J. Kopp, Richmond Hill, N.Y., assignors to Bell Telephone Laboratories, Incorporated, New York, N.Y., a corporation of New York Filed Apr. 28, 1959, Ser. No. 809,421
6 Claims. (Cl. 179—170)

This invention relates to wave transmission and more particularly to a two-way, negative-impedance repeater adapted to operate between unequal impedances.

The principal object of the invention is to reduce or eliminate reflection at one end of a two-way repeater operating between unequal terminal impedances. Another object is to widen the band over which an impedance match is obtainable.

Two-way repeaters are often required in wave transmission systems such as loaded voice-frequency transmission lines. These may be located at the end of the line or at an intermediate point. In order to reduce reflection effects and singing in the system, it is important that the repeater should present a good match to the terminal impedance, at least at one end, over a broad band of frequencies. This is sometimes difficult when the repeater operates between unequal terminal impedances, especially if one or both of the impedances are complex.

In accordance with the present invention, a good impedance match over a band of frequencies is obtained at one end of the repeater by a special choice of its image impedance. The required image impedance has one of four values which are determined by the terminal impedances and the gain of the repeater. The repeater may be built as a lattice, a bridged-T, or any other equivalent structure, generally requiring two or more negative-impedance converters.

The nature of the invention and its various objects, features, and advantages will appear more fully in the following detailed description of the typical embodiments illustrated in the accompanying drawing, of which:

Figure 4:
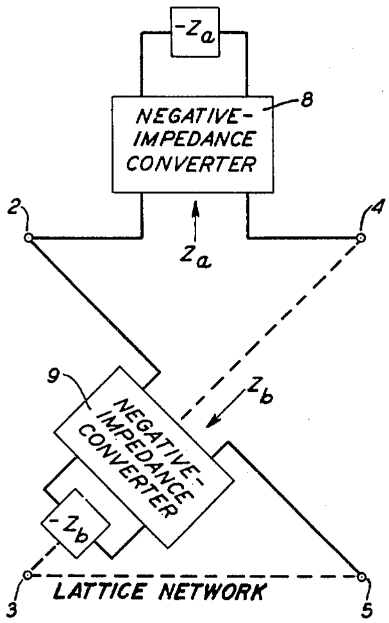
FIG. 4 shows a symmetrical lattice network and FIG. 5 a balanced bridged-T network suitable for the repeater of FIG. 1.
Figure 10:
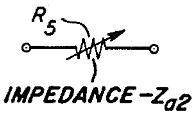
Figure 11:
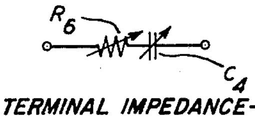
Figure 8:
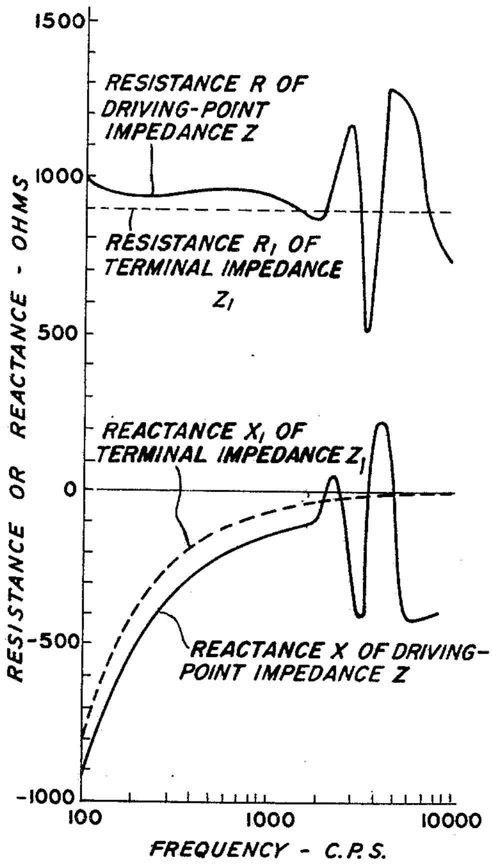
Figure 9:
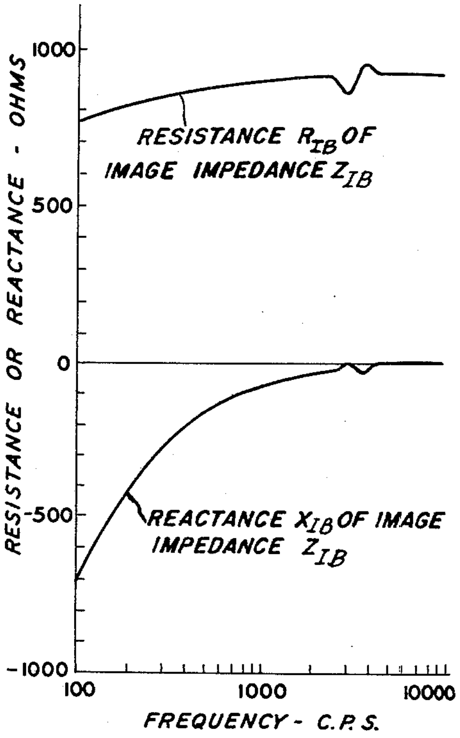

FIG. 8 presents a graphic comparison of the impedance of the terminated repeater and the terminating impedance to be matched;

FIG. 9 shows the resistance $R_{IB}$ and the reactance $X_{IB}$ of another image impedance $Z_{IB}$ suitable for the repeater; and FIGS. 10 and 11 show impedances suitable, respectively, for the impedances $-Z_a$ and $-Z_b$ of FIG. 4 to realize $Z_{IB}$.

Figure 1:
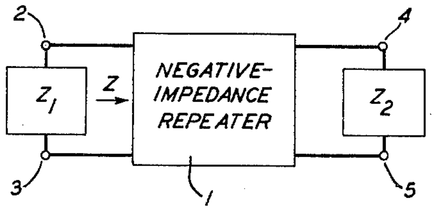
FIG. 1 is a block diagram showing a negative-impedance repeater in accordance with the invention operating between unequal impedances.

FIG. 1 shows a two-way, negative-impedance repeater 1 with an impedance $Z_1$ connected to the terminals 2—3 and an impedance $Z_2$ connected to the terminals 4—5. The impedances $Z_1$ and $Z_2$ are unequal and either or both may be complex.

It will be assumed that reflection is to be minimized at the terminals 2—3. Therefore, the same impedance must be seen looking in either direction from these terminals. For this condition, $$Z_1 = Z_I\left[\frac{Z_2 + Z_I \tanh\theta}{Z_I + Z_2 \tanh\theta}\right] \quad (1)$$

where $\theta$ is the transfer constant of the repeater 1, and will be negative in sign, and $Z_I$ is its image impedance. By image impedance is meant one of the two equal impedances which will simultaneously terminate the two pairs of terminals 2—3 and 4—5 in such a way that, at each of these pairs of terminals, the impedances in both directions are equal. Equation 1 is essentially the same as Equation 48 on page 137 of the book by K. S. Johnson, entitled "Transmission Circuits for Telephonic Communication," published by Van Nostrand Co., New York, 1925. However, we have set the driving-point impedance Z equal to the terminal impedance $Z_1$ and use the symbol $Z_2$ for the other terminal impedance $Z_R$. As indicated by the arrow in FIG. 1, the driving-point impedance Z of the repeater 1 is the impedance seen at the terminals 2—3 when the impedance $Z_2$ is connected between the terminals 4—5 and the impedance $Z_1$ is removed.

From Equation 1, $$Z_I^2 = \frac{Z_I(Z_1 - Z_2)}{\tanh\theta} + Z_1 Z_2 \quad (2)$$

and $$Z_I = \pm\left[\frac{Z_1 - Z_2}{2\tanh\theta} \pm \sqrt{\left[\frac{Z_2 - Z_1}{2\tanh\theta}\right]^2 + Z_1 Z_2}\right] \quad (3)$$

It is seen from Equation 3 that there are two choices of ± to be made in evaluating $Z_I$. Therefore, $Z_I$ may have any one of four different values. These are determined by choosing both ± signs as +, both as −, the first as + and the second as −, or the first as − and the second as +. However, in order to facilitate the synthesis of the network, the signs are preferably so chosen that the real part of $Z_I$ is positive in the frequency range of interest.

Figure 2:
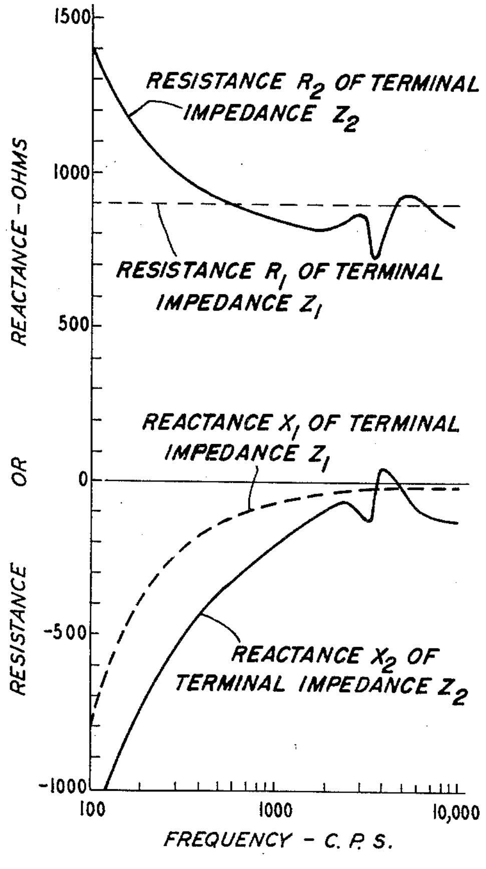
FIG. 2 is a set of graphs showing the frequency characteristics of the resistance and reactance of terminal impedances assumed as an example.

An example in which the terminal impedances $Z_1$ and $Z_2$ are both complex will not be presented. The broken-line curves of FIG. 2 show the resistance $R_1$ and the reactance $X_1$ of the impedance $Z_1$. The solid-line curves show the resistance $R_2$ and the reactance $X_2$ of the other impedance $Z_2$. These characteristics are plotted over a frequency range of 100 to 10,000 cycles per second, on a logarithmic scale. The impedance $Z_1$ is typical of that encountered at the office end of a telephone cable. The resistance $R_1$ is constant at 900 ohms and the reactance $X_1$ is that of a capacitor having a value of two microfarads. The impedance $Z_2$ represents that of a long, loaded, 22-gauge cable with a building-out network at the near end and an image-impedance termination at the other end. It is seen that there is some irregularity in $R_2$ and $X_2$ in the neighborhood of 3,500 cycles, the cut-off frequency of the cable.

It will be assumed that the repeater 1 has a uniform gain of 0.7 nepers (about six decibels) and negligible phase shift over the band of interest. Therefore, the transfer constant is $$\theta = -(0.7 + j0) = -0.7 \quad (4)$$

Figure 3:
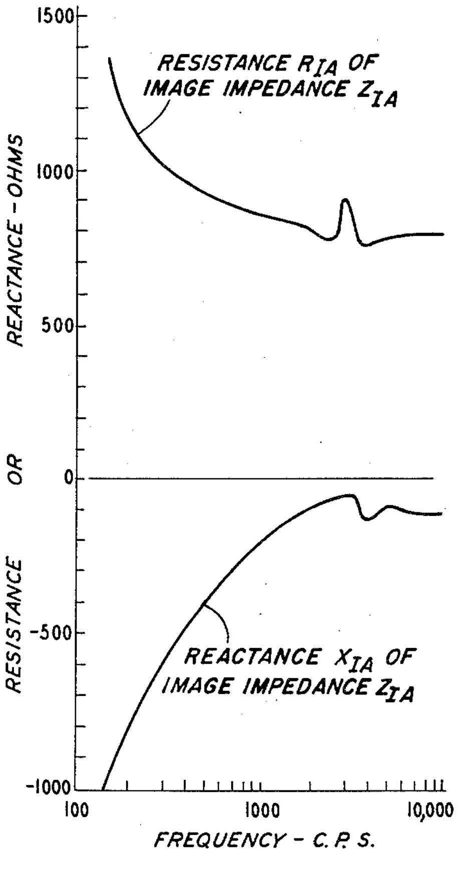
FIG. 3 shows the resistance $R_{IA}$ and reactance $X_{IA}$ of one image impedance $Z_{IA}$ suitable for the repeater.

One possible image impedance $Z_{IA}$ is now found from Equation 3 by substituting —0.7 for $\theta$ and choosing both ± signs as +. The curves of FIG. 3 show the required resistance $R_{IA}$, which is positive, and reactance $X_{IA}$, which is negative.

The next step is to synthesize the repeater network. FIG. 4 shows one suitable configuration in the form of a symmetrical lattice structure with two equal series branches each of impedance $Z_a$ and two equal diagonal branches each of impedance $Z_b$. To simplify the drawing, only one series and one diagonal branch are shown in detail. The other branches are indicated by broken lines connecting the appropriate terminals. These impedances are found from the image impedance and the transfer constant by using the relationships:

$$Z_a = Z_{IA} \tanh \frac{\theta}{2} \quad (5)$$

$$Z_b = Z_{IA} \coth \frac{\theta}{2} \quad (6)$$

Since $\theta$ is negative, both $Z_a$ and $Z_b$ will have negative real parts. Impedances with negative real parts are easily obtained by means of four negative-impedance converters, each having an impedance conversion ratio approximately equal to $-1$. Each series branch of the lattice includes such a converter 8 terminated in an impedance $-Z_a$. Each diagonal branch comprises a converter 9 terminated in an impedance $-Z_b$.

Figure 5:
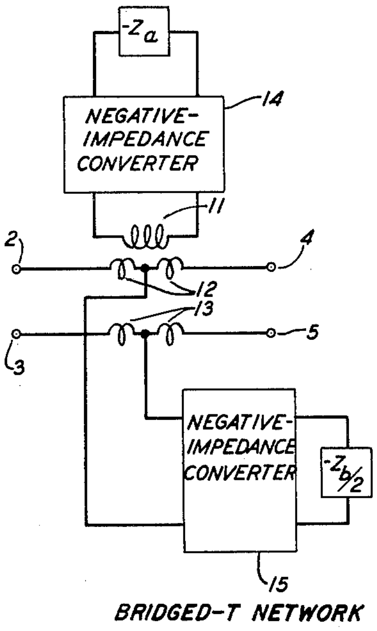

FIG. 5 shows a balanced bridged-T network, equivalent to the lattice of FIG. 4, which may be used for the repeater 1. The bridging branch comprises a winding 11 closely coupled to each of the two series windings 12 and 13 in the two sides of the line, and a negative-impedance converter 14 terminated in an impedance $-Z_a$. The shunt branch, connected between the midpoints of the series windings 12 and 13, comprises a second negative-impedance converter 15 terminated in an impedance $-Z_{b/2}$.

Figure 6:
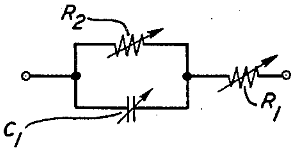
FIGS. 6 and 7 show impedances suitable, respectively, for the impedances $-Z_a$ and $-Z_b$ of FIG. 4 to realize $Z_{IA}$.
Figure 7:
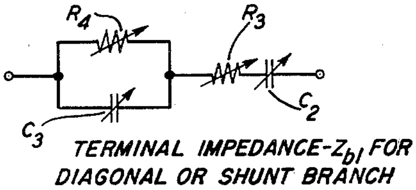

Good simulation of the impedance $-Z_a$ over the band of interest may be provided by the impedance branch $-Z_{a1}$ shown in FIG. 6, comprising a resistor $R_1$ in series with the parallel combination of a second resistor $R_2$ and a capacitor $C_1$. The impedance $-Z_b$ or $-Z_{b/2}$ may be simulated satisfactorily by the branch $-Z_{b1}$ shown in FIG. 7, which comprises the series combination of a resistor $R_3$ and a capacitor $C_2$ in series with the parallel combination of a resistor $R_4$ and a capacitor $C_3$. One or more of the component elements may be made adjustable, as indicated by the arrows, to permit an adjustment of the repeater gain or to allow for changes in the impedances $Z_1$ and $Z_2$.

The curves of FIG. 8 show how well the driving-point impedance Z of the terminated repeater 1 matches the terminal impedance $Z_1$. The solid-line curves R and X are the resistance and the reactance, respectively. The resistance $R_1$ and reactance $X_1$ of the impedance $Z_1$ are plotted in broken-line curves for comparison. It is seen that the resistive match and the reactive match are both excellent over the voice band, and are close enough outside of the band to prevent singing. Of course, the match can be made closer by adding elements to the impedances $-Z_{a1}$ and $-Z_{b1}$.

FIG. 9 shows another possible image impedance $Z_{IB}$, found from Equation 3 by choosing both $\pm$ signs as $-$. Here, also, the resistance $R_{IB}$ is positive and the reactance $X_{IB}$ is negative. This image impedance may be closely approximated in the lattice network of FIG. 1 if the impedance $-Z_a$ is simulated by the impedance branch $-Z_{a2}$ shown in FIG. 10, which is simply a resistor $R_5$, and the impedance $-Z_b$ is simulated by the impedance branch $-Z_{b2}$ comprising a resistor $R_6$ and a capacitor $C_4$ in series, as shown in FIG. 11. Of course, the approximation may be made more exact by adding elements to $-Z_{a2}$ or $-Z_{b2}$.

In the two embodiments described, the required values of the resistors in ohms and capacitors in microfarads are as follows:

| | |
|---|---|
| $R_1$ | 273 |
| $R_2$ | 725 |
| $R_3$ | 2485 |
| $R_4$ | 1232 |
| $R_5$ | 300 |
| $R_6$ | 2660 |
| $C_1$ | 2.33 |
| $C_2$ | 0.416 |
| $C_3$ | 0.432 |
| $C_4$ | 0.664 |

It is to be understood that the above-described arrangements are only illustrative of the application of the principles of the invention. Numerous other arrangements may be devised by those skilled in the art without departing from the spirit and scope of the invention.

What is claimed is:

1. An active transducer adapted to operate between a terminal impedance $Z_1$ at one end and a terminal impedance $Z_2$ of different value at the other end substantially without reflection at the one end, the image impedance of the transducer being approximately equal to $$+\left[\frac{Z_1-Z_2}{2\tanh\theta}+\sqrt{\left[\frac{Z_2-Z_1}{2\tanh\theta}\right]^2+Z_1Z_2}\right]$$

where $\theta$ is the transfer constant of the transducer.

2. A transducer in accordance with claim 1 in which one of the terminal impedances is complex.

3. A transducer in accordance with claim 1 in which $\theta$ has a negative real part.

4. An active transducer adapted to operate between a terminal impedance $Z_1$ at one end and a terminal impedance $Z_2$ of different value at the other end substantially without reflection at the one end, the image impedance of the transducer being approximately equal to $$-\left[\frac{Z_1-Z_2}{2\tanh\theta}-\sqrt{\left[\frac{Z_2-Z_1}{2\tanh\theta}\right]^2+Z_1Z_2}\right]$$

where $\theta$ is the transfer constant of the transducer.

5. A transducer in accordance with claim 4 in which one of the terminal impedances is complex.

6. A transducer in accordance with claim 4 in which $\theta$ has a negative real part.

References Cited in the file of this patent

UNITED STATES PATENTS

| | | |
|---|---|---|
| 2,582,498 | Merrill | Jan. 15, 1952 |
| 2,685,066 | Barney | July 27, 1954 |
| 2,694,184 | Rounds | Nov. 9, 1954 |
| 2,742,616 | Merrill | Apr. 17, 1956 |
| 2,788,496 | Linvill | Apr. 9, 1957 |
| 2,844,669 | Arndt | July 22, 1958 |
| 2,878,325 | Merrill | Mar. 17, 1959 |
| 2,904,641 | Radcliffe | Sept. 15, 1959 |